(12) United States Patent
Kuo et al.

(10) Patent No.: US 10,802,321 B2
(45) Date of Patent: Oct. 13, 2020

(54) OPTICAL FILM FOR LIQUID CRYSTAL DISPLAY

(71) Applicant: BenQ Materials Corporation, Taoyuan (TW)

(72) Inventors: Chen-Kuan Kuo, Taoyuan (TW); Cyun-Tai Hong, Taoyuan (TW); Meng-Chieh Chou, Taoyuan (TW); Chuen-Nan Shen, Taoyuan (TW); Meng-Jie Lin, Taoyuan (TW); Chia-Feng Lin, Taoyuan (TW); Fung-Hsu Wu, Taoyuan (TW); Meng-Chia Cheng, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 221 days.

(21) Appl. No.: 16/036,532

(22) Filed: Jul. 16, 2018

(65) Prior Publication Data
US 2019/0025630 A1    Jan. 24, 2019

Related U.S. Application Data

(60) Provisional application No. 62/535,145, filed on Jul. 20, 2017, provisional application No. 62/535,154, filed on Jul. 20, 2017.

(30) Foreign Application Priority Data

Dec. 14, 2017    (TW) .............................. 106144022 A (51) Int. Cl.
*G02B 5/18* (2006.01)
*G02F 1/1335* (2006.01)
*G11B 7/135* (2012.01)

(52) U.S. Cl.
CPC ..... *G02F 1/133504* (2013.01); *G02B 5/1842* (2013.01); *G02B 5/1866* (2013.01); *G11B 7/135* (2013.01)

(58) Field of Classification Search
CPC .. G02B 5/003; G02B 5/18; G02B 2005/1804; G02B 5/1814; G02B 5/1866;
(Continued)

(56) References Cited

U.S. PATENT DOCUMENTS 5,760,961 A * 6/1998 Tompkin ............. G03H 1/0252
250/271
6,841,238 B2 * 1/2005 Argoitia ............... G02B 5/1861
252/582

(Continued)

FOREIGN PATENT DOCUMENTS

JP    2010039259 A    2/2010
JP    P2010-39259 A    2/2010
(Continued)

*Primary Examiner* — Arnel C Lavarias (57) ABSTRACT

An optical film includes a first diffraction layer, a second diffraction layer, and a cover layer. The first diffraction layer includes a plurality of first diffraction gratings arranged in the same direction on a surface thereof. The second diffraction layer includes a plurality of second diffraction gratings arranged in the same direction gap-filled the first diffraction gratings of the first diffraction layer, wherein the directions of the first diffraction gratings and the second diffraction gratings are parallel to each other. The cover layer is formed on the second diffraction gratings of the second diffraction layer. At least one of the first diffraction layer, the second diffraction layer and the cover layer contains dyes, and therefore, the optical film can reduce the light leakage defect of a conventional liquid crystal display in a large viewing angles and make the liquid crystal display have uniform dark-state images and colorful images.

12 Claims, 8 Drawing Sheets

(58) Field of Classification Search
CPC .......... G02B 5/189; G02B 5/22; G02B 5/223; G02B 27/42; G02B 27/4233; G02B 27/425; G02B 27/4272
USPC ....... 359/558, 566, 569, 571, 573, 574, 575, 359/576, 885, 892
See application file for complete search history.

(56) References Cited

U.S. PATENT DOCUMENTS

| | | | |
|---|---|---|---|
| 7,961,396 B2* | 6/2011 | Suzuki ................. | G02B 25/001 359/569 |
| 8,441,727 B2* | 5/2013 | Schnieper ............ | G02B 5/1809 359/15 |
| 9,482,803 B2* | 11/2016 | Dehmlow .............. | G02B 23/14 |

FOREIGN PATENT DOCUMENTS

| | | |
|---|---|---|
| TW | 200501135 A | 1/2005 |
| TW | 201733801 A | 10/2017 |

* cited by examiner

OPTICAL FILM FOR LIQUID CRYSTAL DISPLAY

This application claims the benefit of Taiwanese application serial No. 106144022, filed on Dec. 14, 2017, U.S. provisional application Ser. No. 62/535,145, filed on Jul. 20, 2017, and U.S. provisional application Ser. No. 62/535,154, filed on Jul. 20, 2017, the subject matters of which are incorporated herein by reference.

BACKGROUND OF THE INVENTION

Field of the Invention

The invention relates in general to an optical film for a liquid crystal display, and more particularly relates to an optical film for reducing color washout and dark-state light leakage defect at wide viewing angles, and increasing the uniformity of the color and dark-state images at wide viewing angles.

Description of the Related Art

The liquid crystal display (LCD) is a non-self-luminous display, thus as the backlight passes through the liquid crystal panel, the image quality presents in the side view is lower than that presents in the front view due to the asymmetry of the liquid crystal molecules.

Figure 1:
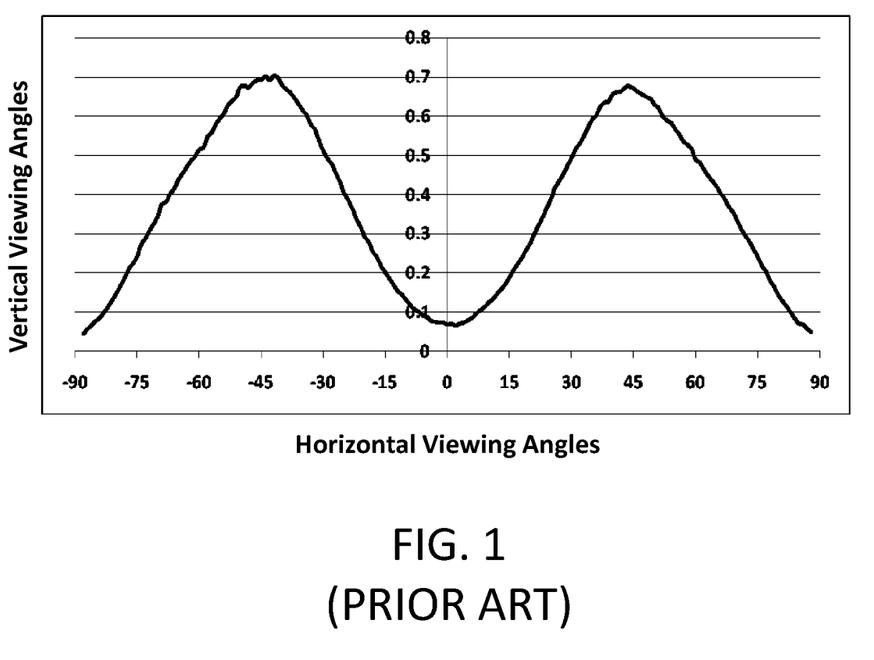
FIG. 1 is a brightness distribution in the dark-state of a common liquid crystal display at horizontal viewing angles.

Especially, when presenting black color on the LC display, the LC panel is switched to dark state to shade the light because the backlight cannot be in off-state. Therefore, the contrast and color presented by LC display will vary in different viewing angles and result in the color washout and uneven of the image presented thereon owing to light leakage occurring more or less at different viewing angles. FIG. 1 shows the brightness distribution in a dark state of a common liquid crystal display at horizontal viewing angles. As shown in FIG. 1, the light leakage in dark state reaches to the most at 45° viewing angle and reaches the minimal at 0° viewing angle. The viewers will perceive that the image quality varies at different viewing angles and sense the adversely visual experience.

Therefore, the present invention is to provide an optical film for reducing light leakage at wide viewing angles of the liquid crystal display, increasing uniformity of the dark-state images at different viewing angles and reducing color washout.

SUMMARY OF THE INVENTION

In an aspect of the optical film of present invention, the optical film comprises a first diffraction layer with a upper surface and a lower surface, including a plurality of first diffraction gratings arranged in the same direction on the upper surface thereof; a second diffraction layer with a plurality of second diffraction gratings arranged in the same direction gap-filled in and on the first diffraction gratings of the first diffraction layer, wherein the directions of the first diffraction gratings and the second diffraction gratings are parallel to each other; and a cover layer containing dyes formed on the second diffraction gratings of the second diffraction layer.

In another aspect of the optical film of present invention, the optical film comprises a first diffraction layer with a upper surface and a lower surface, including a plurality of first diffraction gratings arranged in the same direction on the upper surface thereof; a second diffraction layer containing dyes with a plurality of second diffraction gratings arranged in the same direction gap-filled in and on the first diffraction gratings of the first diffraction layer, wherein the directions of the first diffraction gratings and the second diffraction gratings are parallel to each other; and a cover layer formed on the second diffraction gratings of the second diffraction layer.

In further another aspect of the optical film of present invention, the optical film comprises a first diffraction layer containing dyes with a upper surface and a lower surface, including a plurality of first diffraction gratings arranged in the same direction on the upper surface thereof; a second diffraction layer with a plurality of second diffraction gratings arranged in the same direction gap-filled in and on the first diffraction gratings of the first diffraction layer, wherein the directions of the first diffraction gratings and the second diffraction gratings are parallel to each other; and a cover layer formed on the second diffraction gratings of the second diffraction layer.

In another embodiment of the optical film of present invention, the first diffraction layer has a first refraction index of n1, the second diffraction layer has a second refraction index of n2, the cover layer has a third refraction index of n3, and n1, n2 and n3 are all in the range of 1.4 to 1.7.

In another embodiment of the optical film of the present invention, n2 is greater than n1 and n3.

In another embodiment of the optical film of present invention, n1 and n3 can be the same or different.

In another embodiment of the optical film of present invention, the widths, the depths and the grating gaps of the first diffraction gratings and the widths, the depths and the grating gaps of the second diffraction gratings can be the same or different.

In another embodiment of the optical film of the present invention, the width w1 of each of the first diffraction gratings and the width w2 of each of the second diffraction gratings are independently in the range of 0.3 μm to 1.5 μm.

In another embodiment of the optical film of the present invention, the depth d1 of each of the first diffraction gratings and the depth d2 of each of the second diffraction gratings are independently in the range of 0.5 μm to 1.5 μm.

In another embodiment of the optical film of the present invention, the grating gap g1 between adjacent two of the first diffraction gratings and the grating gap g2 between adjacent two of the second diffraction gratings are independently in the range of 0.3 μm to 1.5 μm.

In another embodiment of the optical film of the present invention, at least one of the first diffraction layer, the second diffraction layer and the cover layer comprises dyes. For example, in an embodiment of the optical film, both the first diffraction layer and the cover layer both contain dyes.

In another embodiment of the optical film of the present invention, the dyes comprises one or one more kind of dyes and/or light absorbing particles absorbing lights of different wavelengths.

In another aspect of the optical film of the present invention, the optical film further comprises a functional layer disposed on the lower surface of the first diffraction layer, wherein the functional layer is selected from one of a group consisting of a polarizing layer, a hard-coating layer, a low reflective layer, an anti-reflective layer, an anti-glaring film and a protective layer or combinations thereof.

The above and other aspects of the invention will become better understood with regard to the following detailed description of the preferred but non-limiting embodiment(s). The following description is made with reference to the accompanying drawings.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings the structure of the apparatus known only schematically depicted in figures.

The present invention is to provide an optical film. The present optical film comprises a first diffraction layer with a upper surface and a lower surface, including a plurality of first diffraction gratings arranged in the same direction on the upper surface thereof; a second diffraction layer with a plurality of second diffraction gratings arranged in the same direction gap-filled in and on the first diffraction gratings of the first diffraction layer, wherein the directions of the first diffraction gratings and the second diffraction gratings are parallel to each other; and a cover layer formed on the second diffraction gratings of the second diffraction layer; wherein at least one of the first diffraction layer, the second diffraction layer or the cover layer contains dyes.

Figure 2A:
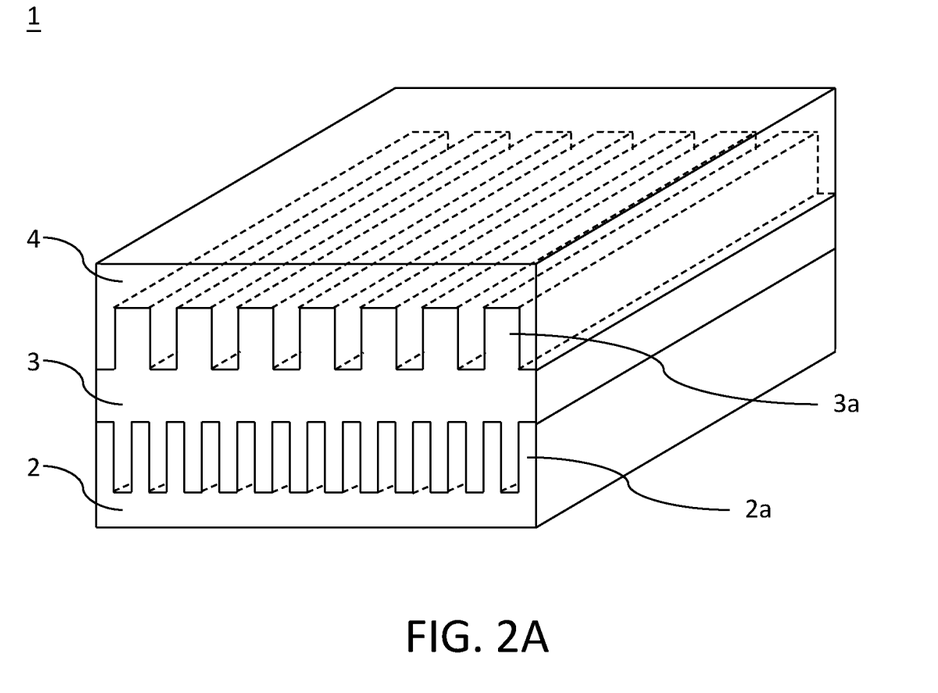
FIG. 2A is a stereoscopic perspective view of an optical film of a preferred embodiment of the present invention.
Figure 2B:
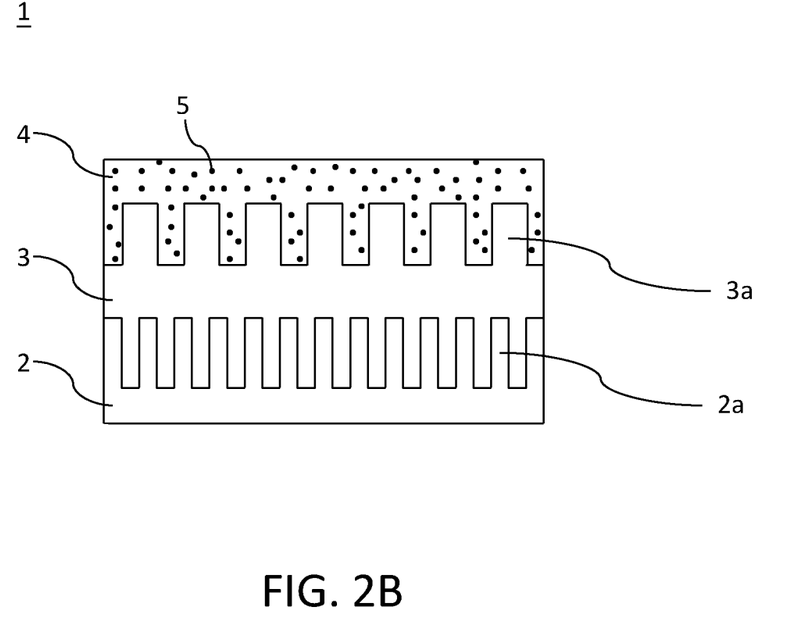
FIGS. 2B to 2E show the cross-sectional views of the optical films of the embodiments of the present invention.

In a preferred embodiment of the present invention as shown in FIG. 2A, the optical film 1 comprises a the first diffraction layer 2 with an upper surface and a lower surface (not shown), including a plurality of first diffraction gratings 2a arranged in the same direction on the upper surface thereof; a second diffraction layer 3 gap-filled in and on the first diffraction gratings 2a of the first diffraction layer 2, wherein the directions of the first diffraction gratings 2a and the second diffraction gratings 3a are parallel to each other; and a cover layer 4 comprises dyes 5 formed on the second diffraction gratings 3a of the second diffraction layer 3 for filling and planarizing the second diffraction gratings 3a of the second diffraction layer 3. Further to refer to FIG. 2B showing the cross sectional view of an embodiment of the optical film 1, the cover layer 4 comprises dyes 5.

Figure 2C:
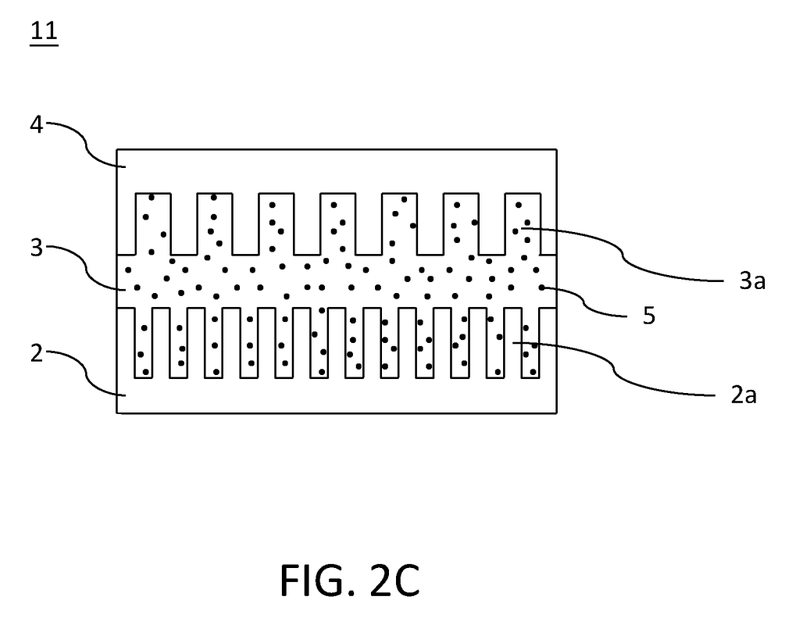

In a preferred embodiment of the present invention as shown in FIG. 2C, the optical film 11 comprises a first diffraction layer 2 with an upper surface and a lower surface (not shown), including a plurality of first diffraction gratings 2a arranged in the same direction on the upper surface thereof; a second diffraction layer 3 comprising dyes 5 with a plurality of second diffraction gratings 3a arranged in a direction gap-filled in and on the first diffraction gratings 2a of the first diffraction layer 2, wherein the directions of the first diffraction gratings 2a and the second diffraction gratings 3a are parallel to each other; and a cover layer 4 formed on the second diffraction gratings 3a of the second diffraction layer 3 for filling and planarizing the second diffraction gratings 3a of the second diffraction layer 3.

Figure 2D:
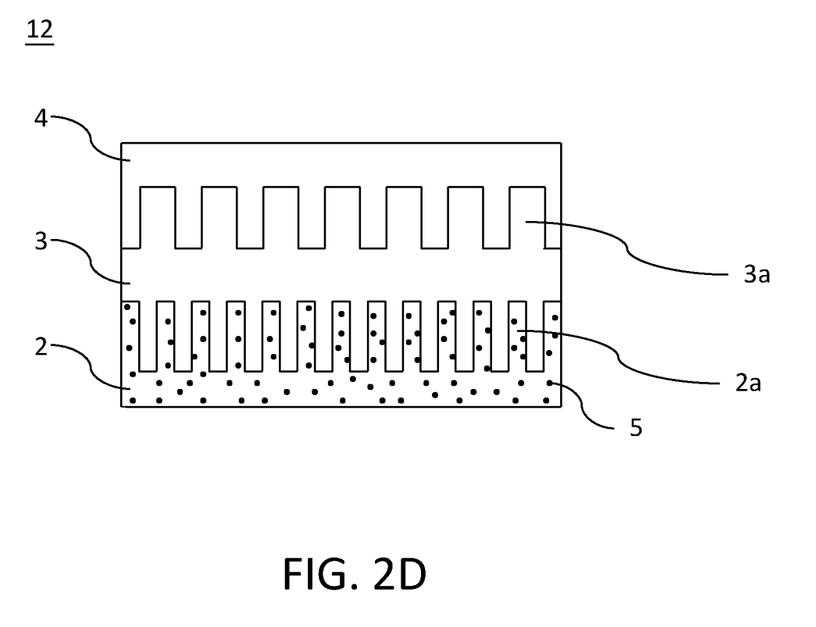

In another embodiment of the present invention as shown in FIG. 2D, the optical film 12 comprises a first diffraction layer 2 containing dyes 5 with an upper surface and a lower surface (not shown), including a plurality of first diffraction gratings 2a arranged in the same direction on the upper surface thereof; a second diffraction layer 3 with a plurality of second diffraction gratings 3a arranged in a direction gap-filled in and on the first diffraction gratings 2a of the first diffraction layer 2, wherein the directions of the first diffraction gratings 2a and the second diffraction gratings 3a are parallel to each other; and a cover layer 4 formed on the second diffraction gratings 3a of the second diffraction layer 3 for filling and planarizing the second diffraction gratings 3a of the second diffraction layer 3.

Figure 2E:
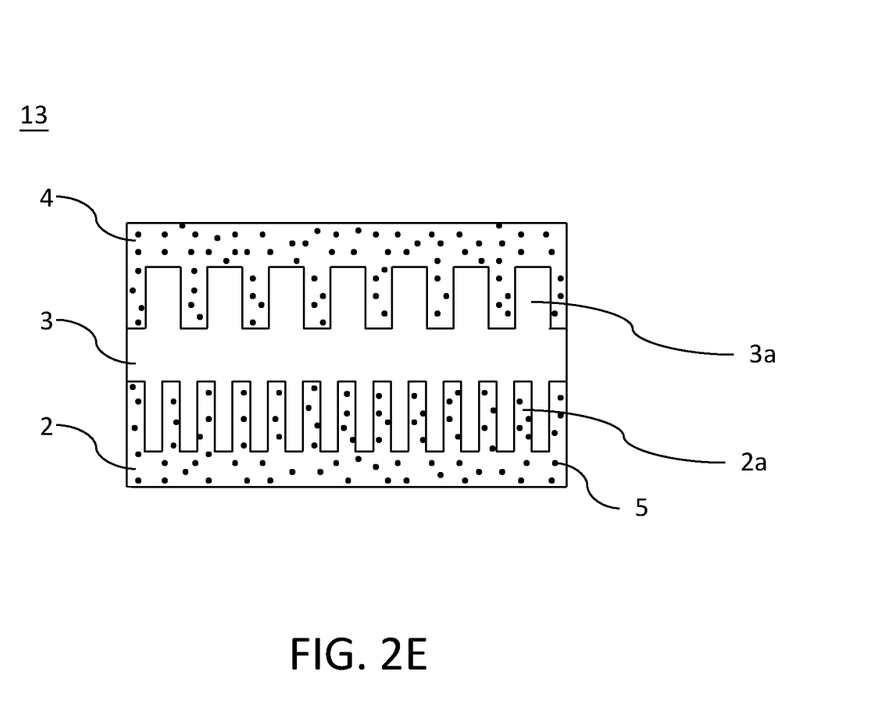

In still another embodiment of the present invention as shown in FIG. 2E, the optical film 13 comprises a first diffraction layer 2 containing dyes 5 with a upper surface and a lower surface (not shown), including a plurality of first diffraction gratings 2a arranged in the same direction on the upper surface thereof; a second diffraction layer 3 with a plurality of second diffraction gratings 3a arranged in the same direction gap-filled in and on the first diffraction gratings 2a of the first diffraction layer 2, wherein the directions of the first diffraction gratings 2a and the second diffraction gratings 3a are parallel to each other; and a cover layer 4 containing dyes 5 formed on the second diffraction gratings 3a of the second diffraction layer 3 for, such as, filling and planarizing the second diffraction gratings 3a of the second diffraction layer 3. Furthermore, the layer thickness of the first diffraction layer 2, the second diffraction layer 3 and the cover layer 4 and the concentration of the dye 5 in the different layers can be varied in dependent to the light leakage in the dark state of a display. For example, the thickness of the layers can be increased to enhance the light absorption or decreased to decrement the light absorption under the same dye concentration in the layer.

In the optical films of the embodiments of the present invention, the first diffraction layer has a first refraction index of n1, the second diffraction layer has a second refraction index of n2, the cover layer has a third refraction index of n3, and n1, n2 and n3 are all in the range of 1.4 to 1.7. The materials of the first diffraction layer, the second diffraction layer and the cover layer can be thermo curable or photo curable resins, such as acrylic resin, silicone resin, polyurethane resin, epoxy resin or the combinations thereof.

In the optical films of the embodiments of the present invention, the second refraction index of n2 is greater than the first refraction index of n1 and the third refraction index of n3. The first refraction index of n1 and the third refraction index of n3 are the same or different. Thus, the refraction index between every two layers of the first diffraction layer, the second diffraction layer and the cover layer are different, wherein the differences of the refraction index between the second diffraction layer and the first diffraction layer and the differences of the refraction index between the second diffraction layer and the cover layer are preferably between 0.1 and 0.3.

Figure 3:
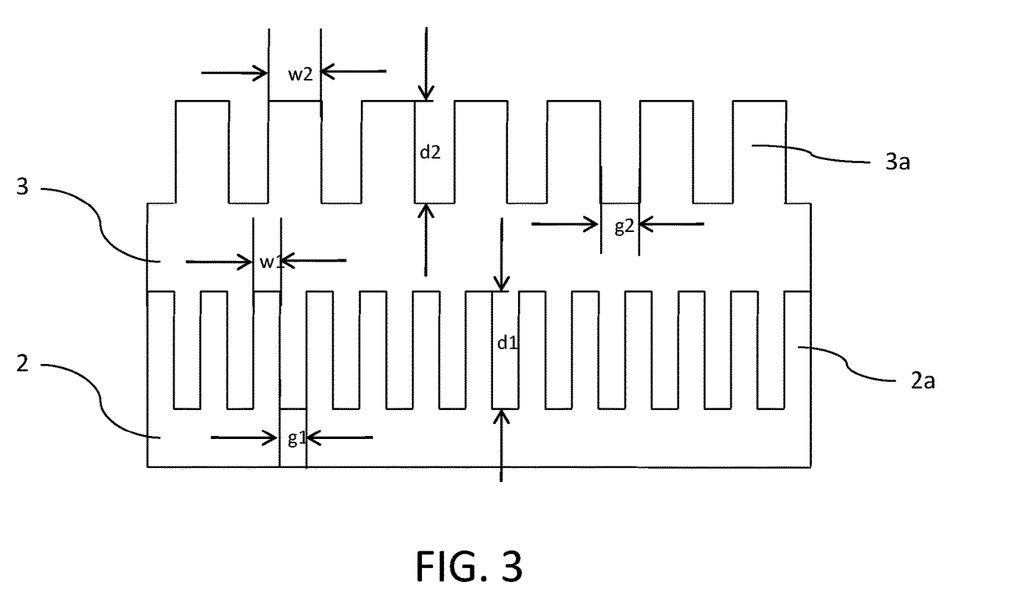
FIG. 3 shows a cross-sectional view of the first diffraction layer and the second diffraction layer in accordance with a preferred embodiment of the present invention.

Moreover, in the optical film of the embodiments of the present invention, the microstructure dimensions of the first diffraction layer and the second diffraction layer can be varied in accordance with the pixel sizes of the desired display. Referring to FIG. 3, it shows a cross-sectional view of the first diffraction layer 2 and the second diffraction layer 3 in accordance with a preferred embodiment of the present invention. In FIG. 3, the width w1 of each of the first diffraction gratings 2a and the width w2 of each of the second diffraction gratings 3a are independently in the range of 0.3 μm to 1.5 μm. The depth d1 of each of the first diffraction gratings 2a and the depth d2 of each of the second diffraction gratings 3a are independently in the range of 0.5 μm to 1.5 μm. The grating gap g1 between adjacent two of the first gratings 2a and the grating gap g2 between adjacent two of the second gratings 3a are independently in the range of 0.3 μm to 1.5 μm.

In an optical films of an embodiment of the present invention, the width w1, depth d1 and the gap g1 of the first diffraction grating 2a and the width w2, depth d2 and the gap g2 of the second diffraction grating 3a are the same or different.

The dyes used in the present optical film comprises one or one more dyes and/or light absorbing particles for absorbing lights of different wavelength. The dyes can be selected by absorption of the specific wavelength light thereof to complement the light leakage of a wavelength band in the dark-state of the display so as to minimize dark light leakage and maintain good color accuracy and saturation for various viewing angles. The examples of the dyes can be used in the present optical film can be but not limited to azo dyes, phthalocyanine dyes, triarylmethane dyes, anthraquinone dyes, hydroxy benzotriazole dyes, tris-resorcinol-triazine chromophore dyes, hydroxylphenyl-benzotriazole chromophore dyes, squarine-based dyes or cyanine-based dyes. The light absorbing particles can be used in the present optical film can be but not limited to carbon black, graphite, metal oxide particles or black resin particles. The concentration of the dyes used in the layers can be varied between 0.01 wt % to 3 wt % in dependent to the light absorption coefficient and/or the dispersibility of the dyes.

Figure 4:
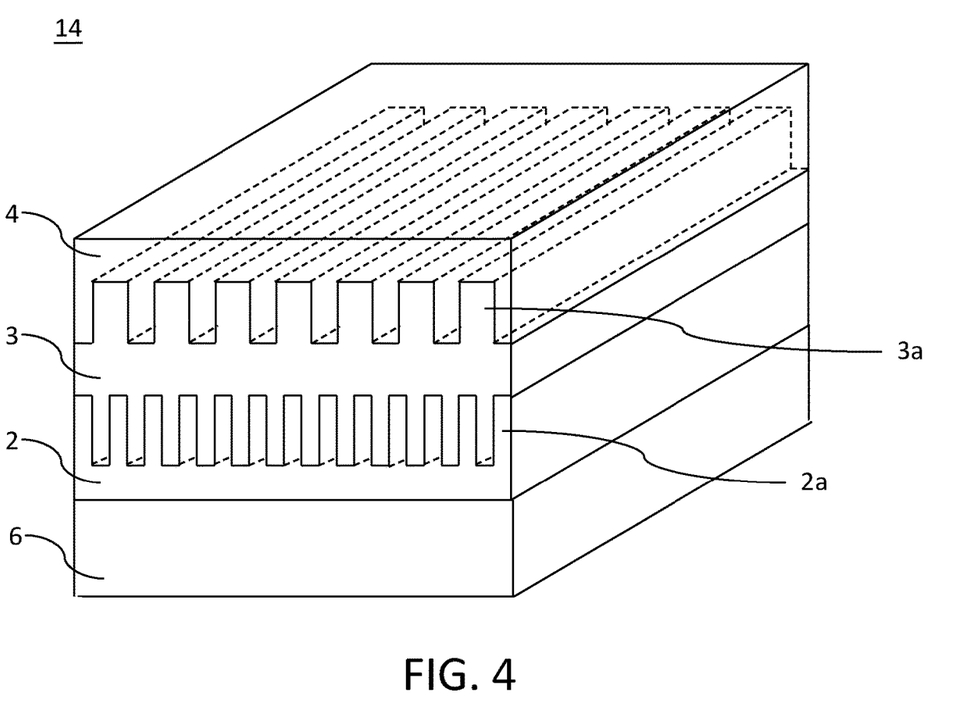
FIG. 4 shows a stereoscopic perspective view of an optical film of a further preferred embodiment of the present invention.

In still another embodiment of the present invention as shown in FIG. 4, the optical film 14 further comprises a functional layer 6. The functional layer 6 is disposed on the lower surface of the first diffraction layer of the optical film 14, wherein the functional layer 6 is selected from one of a group consisting of a polarizing layer, a hard-coating layer, a low reflective layer, an anti-reflective layer, an anti-glaring film and a protective layer or combinations thereof.

Various embodiments of the present invention are exemplified as following to illustrate the effects of the optical film of the present invention on improving the dark-state and the image quality at the wide viewing angle of the liquid crystal display. Table 1 shows the dimension of the first diffraction gratings of the first diffraction layer of the present optical film. Table 2 shows the dimension of the second diffraction gratings of the second diffraction layer of the present optical film. The gratings of the dimensions full of the first diffraction layer and the second diffraction layer. The resin used as the second diffraction layer has a refraction index of 1.6. The resin used as the first diffraction layer and the cover layer have a refraction index of 1.5.

TABLE 1

Dimensions of the first diffraction gratings

| Dimensions of gratings | The first diffraction gratings | | | | | | | | | | |
|---|---|---|---|---|---|---|---|---|---|---|---|
| | 1 | 2 | 3 | 4 | 5 | 6 | 7 | 8 | 9 | 10 | 11 |
| Widths, w1 (μm) | 0.6 | 0.6 | 0.5 | 0.4 | 0.5 | 0.6 | 0.6 | 0.5 | 0.4 | 0.4 | 0.4 |
| Depths, d1 (μm) | 1.3 | 0.8 | 0.9 | 0.8 | 1.1 | 1.0 | 1.2 | 1.0 | 0.7 | 0.8 | 0.8 |
| Grating gaps, g1 (μm) | 0.6 | 0.6 | 0.6 | 0.4 | 0.4 | 0.6 | 0.4 | 0.6 | 0.5 | 0.5 | 0.4 |

TABLE 2

Dimensions of the second diffraction gratings

| Dimensions of gratings | The second diffraction gratings | | | | | | | | |
|---|---|---|---|---|---|---|---|---|---|
| | 1 | 2 | 3 | 4 | 5 | 6 | 7 | 8 | 9 |
| Widths, w2 (μm) | 0.7 | 0.7 | 0.7 | 0.81 | 0.81 | 0.81 | 1.28 | 1.28 | 1.28 |
| Depths, d2 (μm) | 0.9 | 0.9 | 0.9 | 0.9 | 0.9 | 0.9 | 1.0 | 1.0 | 1.0 |
| Grating gaps, g2 (μm) | 0.7 | 0.7 | 0.7 | 0.81 | 0.81 | 0.81 | 1.28 | 1.28 | 1.28 |

Table 3 shows the optical properties of the optical films of the present invention on a liquid crystal display (BenQ GW2270, from BenQ Corp. Taiwan). The comparative example did not use any optical film of the present invention. Examples 1 to 4 show LC displays with the optical films of the present invention. The optical film used in Example 1 is an optical film of the present invention with the cover layer containing dyes. The optical film used in Example 2 is an optical film of the present invention with the second diffraction layer containing dyes. The optical film used in Example 3 is an optical film of the present invention with the first diffraction layer containing dye. The optical film used in Example 4 is an optical film of the present invention with both the first diffraction layer and the cover layer containing dyes.

TABLE 3

The optical properties of Comparative Example and Examples 1 to 4

|  | Comparative Example | Example 1 | Example 2 | Example 3 | Example 4 |
|---|---|---|---|---|---|
| $L0_{max}$ (nits) | 0.703 | 0.584 | 0.175 | 0.539 | 0.380 |
| $GDI_{avg.}$ (60°~80°) | 1.55 | 1.28 | 1.21 | 1.31 | 1.30 |
| P-value$_{avg}$ (60°~80°) | 6.33 | 3.73 | 3.69 | 3.92 | 3.99 |
| P-value (0.60) | 5.65 | 3.53 | 3.64 | 3.64 | 3.80 |
| P-value (0.80) | 6.79 | 3.82 | 3.67 | 4.00 | 4.11 |

As shown in table 3, the maximum brightness values in the dark-state of the liquid crystal display with zero-order (the maximum of L0) of the Examples 1 to 4 are all smaller than the value of 0.703 nits of the comparative example, which represents that light leakage at wide viewing angles of the common liquid crystal display equipped with the present optical film can be reduced effectively, and the common liquid crystal display equipped with the present optical film can present a uniform dark-state image at various viewing angles. GDI (Gamma Distortion Index) and P-value are indexes to evaluate the image quality at wide viewing angle, such as color saturation, contrast, color accuracy. GDI is calculated by measuring the distortion value of the gamma curve compared to the standard curve (such as gamma 2.2) of all order from L0 to L255. Therefore, lower value of GDI means the distortion is lower and represents the image quality at wide viewing angle is better. P-value is the difference between the actual measurement and the standard gamma curve at the order of L96, at this order the common liquid crystal display generally presents lower image quality. The lower P-value means the lower deviation. Therefore, the image quality of a display can be evaluated by GDI and P-value. In the Table 3, the average GDI ($GDI_{avg.}$) at 60°~80° horizontal viewing angle, average P-value (P-value$_{avg.}$) at 60°~80° horizontal viewing angle, P-value (0, 60) at 60° horizontal viewing angle and P-value (0, 80) at 80° horizontal viewing angle measured on the displays of examples 1 to 4 are all less than those measured on the display of comparative example. The result shows that the image quality of the display can be enhanced by equipping with the optical films of the present invention.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An optical film, comprising:
   a first diffraction layer with a upper surface and a lower surface opposite to each other, including a plurality of first diffraction gratings arranged in a same direction on the upper surface thereof;
   a second diffraction layer including a plurality of second diffraction gratings arranged in same direction and gap-filled in and on the first diffraction gratings of the first diffraction layer, wherein the directions of the first diffraction gratings and the second diffraction gratings are parallel to each other; and
   a cover layer formed on the second diffraction layer;
   wherein at least one of the first diffraction layer, the second diffraction layer or the cover layer comprises dyes,
   wherein the first diffraction layer has a first refraction index of n1, the second diffraction layer has a second refraction index of n2, the cover layer has a third refraction index of n3, and the second refraction index of n2 is greater than the first refraction index of n1 and the third refraction index of n3.

2. The optical film according to claim 1, wherein n1, n2 and n3 are all in a range of 1.4 to 1.7.

3. The optical film according to claim 2, wherein the first refraction index n1 and the third refraction index n3 are equal or unequal.

4. The optical film according to claim 1, wherein widths, depths and grating gaps of the first diffraction gratings and widths, depths and grating gaps of the second diffraction gratings are equal or unequal.

5. The optical film according to claim 4, wherein a width w1 of each of the first diffraction gratings and a width w2 of each of the second diffraction gratings are independently in a range of 0.3 μm to 1.5 μm.

6. The optical film according to claim 4, wherein a depth d1 of each of the first diffraction gratings and a depth d2 of each of the second diffraction gratings are independently in a range of 0.5 μm to 1.5 μm.

7. The optical film according to claim 4, wherein a grating gap g1 between adjacent two of the first diffraction gratings and a grating gap g2 between adjacent two of the second diffraction gratings are independently in a range of 0.3 μm to 1.5 μm.

8. The optical film according to claim 1, wherein both the cover layer and the first diffraction layer comprise dyes.

9. The optical film according to claim 8, wherein the dyes comprise one or more dyeing molecules or light absorbing particles absorbing lights with different wavelength.

10. The optical film according to claim 1, wherein both the cover layer and the second diffraction layer comprise dyes.

11. The optical film according to claim 10, wherein the dyes comprise one or more dyeing molecules or light absorbing particles absorbing lights of different wavelengths.

12. The optical film according to claim 1, further comprising a functional layer disposed on the lower surface of the first diffraction layer, wherein the functional layer is selected from one of a group consisting of a polarizing layer, a hard-coating layer, a low reflective layer, an anti-reflective layer, an anti-glaring film and a protective layer or combinations thereof.

* * * * *